(12) United States Patent
Bauer

(10) Patent No.: US 7,766,343 B2
(45) Date of Patent: Aug. 3, 2010

(54) HYDRAULIC SPRING SUPPORT SYSTEM

(75) Inventor: Wolfgang Bauer, Weinheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/394,472

(22) Filed: Feb. 27, 2009

(65) Prior Publication Data

US 2009/0230637 A1 Sep. 17, 2009

(30) Foreign Application Priority Data

Mar. 5, 2008 (DE) .................. 10 2008 012 704

(51) Int. Cl.
*B60G 17/00* (2006.01)
(52) U.S. Cl. .................................................. 280/5.5
(58) Field of Classification Search ............ 280/5.5, 280/5.502, 5.504, 5.506, 5.507, 5.519, 6.157, 280/6.159, 124.106, 124.158, 124.159
See application file for complete search history.

(56) References Cited

U.S. PATENT DOCUMENTS

| | | | | |
|---|---|---|---|---|
| 3,550,993 A * | 12/1970 | Peiffer | .................. | 280/6.159 |
| 5,601,307 A * | 2/1997 | Heyring et al. | ........... | 280/6.157 |
| 5,794,966 A * | 8/1998 | MacLeod | .................. | 280/5.507 |
| 6,145,859 A | 11/2000 | Altherr et al. | | |
| 6,318,742 B2 * | 11/2001 | Franzini | .............. | 280/124.106 |
| 6,604,034 B1 * | 8/2003 | Speck et al. | .................. | 701/37 |
| 6,786,492 B2 * | 9/2004 | Brandenburger | ......... | 280/5.519 |
| 6,834,865 B1 * | 12/2004 | Lin | .......................... | 280/5.507 |
| 7,240,906 B2 * | 7/2007 | Klees | ....................... | 280/5.502 |
| 2002/0171209 A1 | 11/2002 | Brandenburger | | |
| 2004/0113377 A1 | 6/2004 | Klees | | |

FOREIGN PATENT DOCUMENTS

| | | |
|---|---|---|
| DE | 10 2005 062 246 | 7/2007 |
| EP | 0 615 870 | 3/1994 |
| EP | 0 670 230 | 2/1995 |
| EP | 0 913 280 | 10/1998 |
| EP | 1 686 045 | 11/2005 |
| EP | 1 232 883 | 1/2007 |

* cited by examiner

*Primary Examiner*—Paul N Dickson
*Assistant Examiner*—Robert A Coker

(57) ABSTRACT

The invention concerns a hydraulic spring support system including a double acting hydraulic cylinder with a piston chamber and a rod chamber, a first accumulator that is connected constantly with the piston chamber, and a second accumulator that is connected constantly with the rod chamber. The invention proposes that the piston chamber and the rod chamber are connected to each other by a variable flow resistance.

6 Claims, 1 Drawing Sheet

HYDRAULIC SPRING SUPPORT SYSTEM

FIELD OF THE INVENTION

The invention concerns a hydraulic spring support system including: a double acting hydraulic cylinder with a piston chamber and a rod chamber a first accumulator that is constantly connected to the piston chamber, and a second accumulator that is constantly connected to the rod chamber.

BACKGROUND OF THE INVENTION

In today's hydro pneumatic spring support systems, two fundamental types have been established, each of which offers particular advantages and disadvantages. On the one hand, these are systems with single acting cylinders or double acting cylinders connected regeneratively in which only the surface of the rod carries the outer force. On the other hand, systems with double acting cylinders are known which are provided with in each case a separate oil circuit and thereby individual springs for each side of the cylinder. While in the case of the single acting systems it is seen as advantageous, that the cost of the configuration is lower than in the case of the double acting cylinders, the latter has the advantage that a pre-load can be established by interaction of the two individual springs formed by the cylinder chambers against each other, that leads to a less over proportional dependance of the spring rate on the immediate load than in the case with single acting cylinders or double acting cylinders connected so as to operate regeneratively. In areas of limited load a nearly proportional behavior can be attained and larger differences between the minimum and maximum spring loads can be operated. The spring rate can also be adjusted by appropriate control of the cylinders.

A relatively rapid adjustment of the spring rate is required for a spring support system independent of external influences such as the contour of the ground or the immediate load adjustable in its damping as well as its spring rate. For this purpose, adjustable dampers had previously been used.

DE 39 02 743 C describes an active wheel or axle support assembly with a hydraulic spring support system of the kind described initially. The chambers of a double acting hydraulic cylinder are connected constantly by adjustable throttle with separate accumulators. Beyond that, the individual chambers separated from each other can be connected by a control or regulating arrangement with the pressure side or the suction side of a hydraulic pump. In the case of a failed operation of the control arrangement actuating the control or regulating valve arrangement or the pump, the control or regulating arrangement takes a position closing the chamber. Accordingly, the mode of operation, in which the chambers of the hydraulic cylinders are connected to the outside only by the accumulator, is used only for an emergency operation.

EP 1 686 045 A describes a self propelled operating machine with a chassis with an operator's station supported upon it by hydraulic cylinders. The piston sides of the hydraulic cylinders are connected permanently with accumulators. In a first switching position a switching arrangement connects the piston chamber of a cylinder with the rod chamber of the particular other cylinder. In another switching position a connection carrying hydraulic fluid is established between the piston chamber of a cylinder and its rod chamber. As a result of the cross connection of the hydraulic cylinders, the first switching position prevents unintended shaking movements of the operators station. The second switching position makes it possible to incline the operator's station in a predetermined region in order, for example, to be able to see an area of the operation that is difficult to observe. The present invention relates to an electronic engine control system which utilizes an exhaust emissions sensor and adaptively maintains a given emissions level.

SUMMARY OF THE INVENTION

Accordingly, an object of this invention is to provide a rapid adjustment of the spring rate and/or damping of a hydro pneumatic support system in order to react to certain possible vibratory excitations.

This and other objects are achieved by the present invention, wherein a first embodiment of the invention includes a double acting hydraulic cylinder that is connected in such a way that the piston chamber and the rod chamber, in each case are permanently associated with an accumulator so that two separate spring support circuits are created, which are connected or may be connected to each other over an adjustable flow resistance. Depending on the size of the flow resistance the hydraulic cylinder is arranged as single acting or double acting which varies the spring support and damping of the hydraulic spring support system. With a relatively large flow resistance, that is, a small or closed, connecting support area of the flow resistance, the hydraulic cylinder is switched to double acting mode, the result is a rather hard, stiff spring support system. On the other hand, in the case of a hydraulic cylinder with a smaller flow resistance, the hydraulic cylinder is switched into a single acting regenerative mode, that is with an open flow resistance with larger flow area, which results in a softer spring support.

In a second embodiment of the invention, two double acting hydraulic cylinders are provided, whose piston chambers and rod chambers, in each case, are connected with accumulators associated with them. Two variable flow resistances are cross connected between the piston chamber of a hydraulic cylinder and the rod chamber of the other hydraulic cylinder and the inverse. Here too the result is of a total or almost closed resistances, in which all cylinder chambers are more or less separated from each other and are provided spring support only through the accumulators, and are subject to a relatively high spring rate. With open flow resistances the cross connection avoids undesired movements of the elements supported by means of the hydraulic spring support in the direction of spacing, where the spring rate is smaller than in the case of closed flow resistances.

The advantages of the invention are seen in the fact that the adjustability of the spring rate and damping can be attained at reasonable cost.

In a preferred embodiment of the invention, throttles or other flow resistances with fixed or variable through-put resistances are switched between the accumulators and the chambers of the hydraulic cylinders connected thereto. The result thereby is that in the case of an adjustment of the flow resistances the damping also changes. In the case of large flow resistances the larger volume flows of the piston chambers and the rod chambers are in each case conducted through only one throttle. In the case of small flow resistances the comparable smaller volume flow flows through two throttles, switched in parallel, into the accumulated volumes. Thereby the result is a softer damping than in the case of large volume flows. Thereby a switching of the damping and the spring support can be performed between the conditions hard and soft by means of an adjustment of the flow resistance or the flow resistances.

Other intermediate conditions can be adjusted by preferably throttles that can be varied proportionally.

The individual flow resistances can be formed in each case by a throttle with variable flow cross sections or an orifice with variable through put cross sections or by a valve arrangement or a cascade arrangement that consist of several of the aforementioned flow resistances that are switched in series or parallel, or any desired combination of these. The valve arrangement may be configured as a pressure control valve or a pressure limiting valve. A useful valve arrangement is provided with only two switch positions and is configured as a 2/2 way valve. In a preferred embodiment the valve arrangement includes an adjustable opening in order to make the flow resistance between the chambers of the hydraulic cylinder or cylinders conform continuously or in two or more steps to the immediate surrounding environmental conditions. The valve arrangement is configured in particular as a proportional valve. Here it is not necessary that the valve arrangement is provided with a fully closed position, but it is also conceivable that it forms a sufficiently open flow resistance in its furthest closed position (although sufficiently large), this can be configured as a throttle.

The variable flow resistance or variable flow resistances is or are connected appropriately with a control or regulating arrangement that is used for automatic, adaptive or semi-active adjustment of the particular flow resistance. Environmental conditions such as the actual load of the spring arrangement and actual vibrations performed by it are detected by means of appropriate sensors and the flow resistance is brought into the immediate desired condition. The control arrangement can control the aforementioned adjustable throttle or other flow resistances that are switched between the chamber of the hydraulic cylinder and the accumulators as a function of the environmental conditions.

This spring support system is particularly appropriate for systems with relatively minor load variations, such as for example the spring support system for operator's stations of vehicles, for example, operator's cab of agricultural vehicles.

DESCRIPTION OF THE PREFERRED EMBODIMENT

Figure 1:
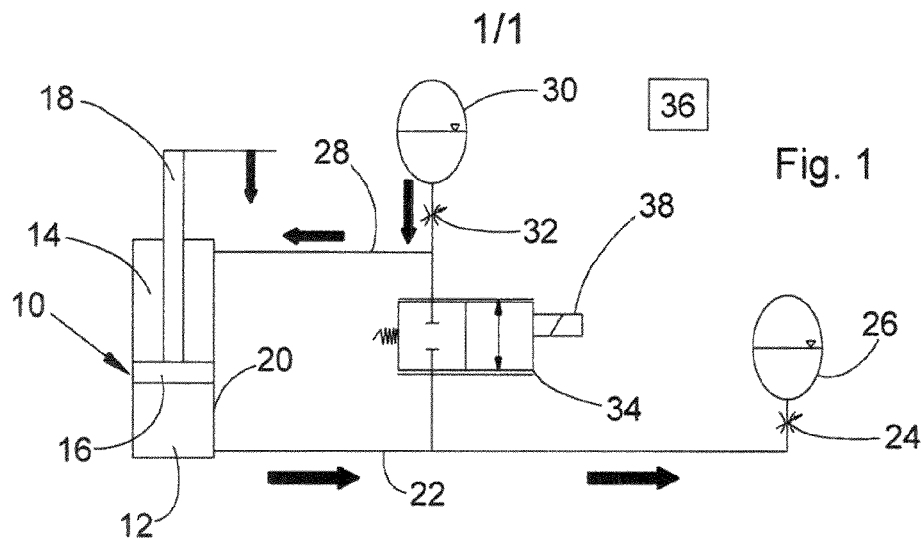
FIG. 1 is circuit diagram of the first embodiment of a hydraulic spring support system, where a valve arrangement forming a variable flow resistance is found in a first position closing the chambers of the hydraulic cylinder.

Referring to FIG. 1, the hydraulic spring support system includes a double acting hydraulic cylinder 10 with a piston chamber 12 and a rod chamber 14, that are separated from each other by a piston 16 that is connected with a rod 18. The hydraulic cylinder 10 is used for the spring support and vibration isolation of a component (for example, an operator's cab) relative to a moving element (for example, the chassis of a vehicle). Either the housing 20 of the hydraulic cylinder 10 or the rod 18 may be connected with the moving element and either the rod 18 or the housing 20 may be connected with the components.

The piston chamber 12 is filled with hydraulic fluid and is connected by a line 22 carrying hydraulic fluid and a fixed or adjustable throttle 24 with an accumulator 26, that includes a gas filled volume with a predetermined pressure and which is separated from the hydraulic fluid by a moveable membrane. Alternatively, any other desired configurations of accumulators can be used, such as piston accumulators or bubble accumulator. The rod chamber 14 is also filled with hydraulic fluid and connected permanently with a second accumulator 30 by a line 28 carrying hydraulic fluid and an adjustable throttle 32, that includes a gas filled volume at a predetermined pressure, that is separated from the hydraulic fluid by a moveable membrane. Alternatively, any desired other configurations of accumulators may be used, such a piston accumulators or bubble accumulators. A valve arrangement 34 is used as a variable flow resistance, is configured in the form of a proportional valve and is connected with both lines 22, 28. Valve 34 may be moved between a first position shown in FIG. 1, in which the lines 22, 28 are separated from each other, and a second position shown in FIG. 2 in which both lines 22, 28 are directly connected to each other. The valve arrangement 34 can be controlled by external forces by means of an electro magnet 38 connected to a control arrangement 36, which can be performed manually by an operator, by hydraulic, pneumatic or mechanical means and can be brought into any desired number of intermediate positions.

Figure 2:
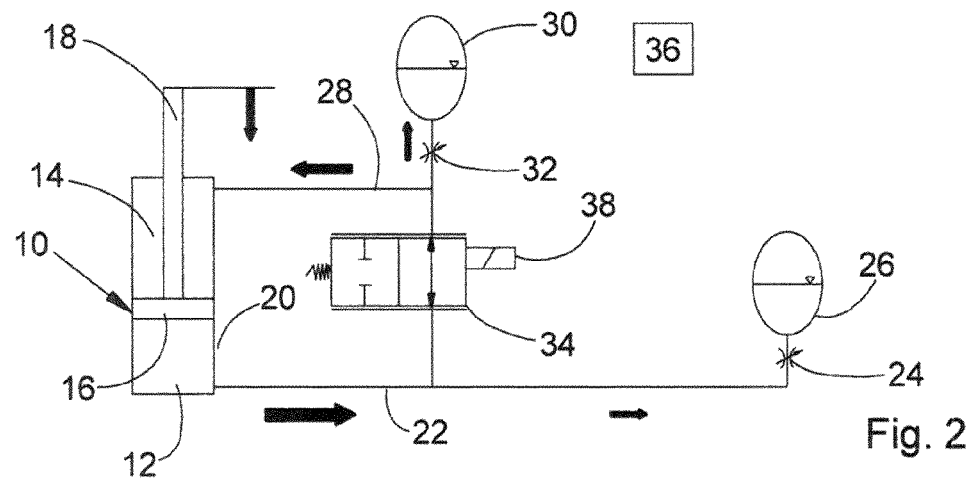
FIG. 2 is a circuit diagram of the FIG. 1 embodiment with a valve arrangement in a second position connecting the chambers of the hydraulic cylinder.

Differing from the illustrations of FIGS. 1 and 2, the valve arrangement 34 can still provide a penetration at its furthest possible closed position, that it the blind bores, shown at left, may be connected by a throttle opening. The control unit 36 detects the environmental conditions by means of appropriate sensors, such as the actual load on the spring support system and any possible vibration excitations performed by these and brings the valve arrangement in the particular appropriate position in which vibrations are avoided to the greatest degree possible. The control unit 36 also controls the adjustable throttles 24, 32.

In the first position (FIG. 1) the valve arrangement 34 is closed. Accordingly the hydraulic cylinder 10 is switched so as to be double acting that result in a relatively stiff spring support and damping. If, on the other hand, the valve arrangement 34 is in the second open position (FIG. 2) then the hydraulic cylinder 10 is in a single acting regenerative mode in which hydraulic fluid can flow from the piston chamber 12 into the rod chamber 14. The result is a softer spring support and damping as compared to the first position.

The resulting flows during the retraction of the rod 18 are indicated schematically by arrows, for example, upon crossing a rise in the ground by the vehicle. The width of the arrows indicates the strength of the volume flow. In the first position of the valve arrangement 34 in the case of external loads occurring on the hydraulic cylinder 10 a relatively large volume is displaced into a single accumulator 26. The result is two springs with a relatively high spring rate. In a second position of the valve arrangement 34 a relatively small volume is displaced into both accumulators 26, 30; accordingly the result is slower spring rate than in the first position. On the basis of the throttles 24, 32 the result is a greater damping in the first position, since the larger volume flows of the rod chamber 14 and the piston chamber 12 are conducted in each case through only a single through-put resistance (the throttles 32, or 24), while the comparatively small volume flow flows in the second position of the valve arrangement 34 through two through-put resistances (throttles 24, 32) into the accumulators 26, 30. The slope of the spring force—spring path—curves can be controlled by the two positions of the valve arrangement 34 by appropriate selection of the effective area of the hydraulic cylinder 10 and the selection of the filling pressure and the volumes of the two accumulators 26, 30.

Figure 3:
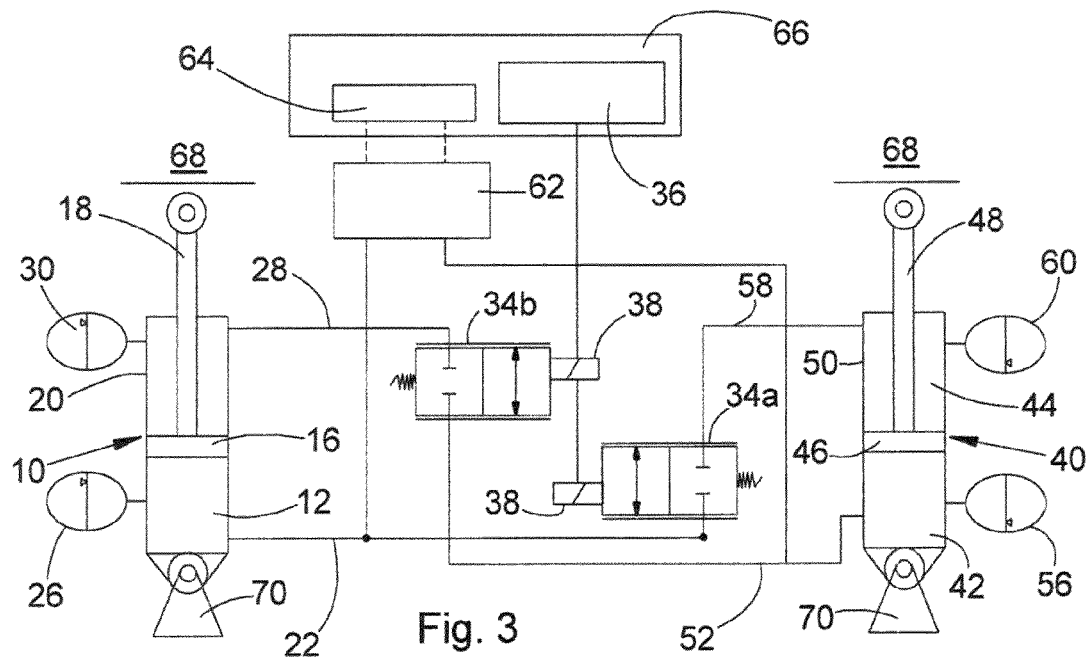
FIG. 3 is a circuit diagram of a second embodiment of a hydraulic spring support system with two hydraulic cylinders that can be switched cross connected.

The spring support system according a second embodiment is shown in FIG. 3. This embodiment includes a first hydraulic cylinder 10 and a second hydraulic cylinder 40 that can be used particularly for the spring support of an operator's cab relative to a chassis 70 of an agricultural vehicle, for example, a tractor or a self propelled harvesting machine, where the hydraulic cylinders 10, 40 are arranged relative to the forward operating direction of the vehicle and can be attached alongside each other or behind each other. Here the housing 20, 50 of the hydraulic cylinders 10, 40 can be connected with the chassis 70 while their rods 18, 48 are connected with the operator's cab 68, or the inverse.

The piston chamber 12 of the first hydraulic cylinder 10 is connected directly and constantly with a first accumulator 26, while the rod chamber 14 of the first hydraulic cylinder 10 is connected directly and constantly with a second accumulator 30. Analogously the piston chamber 42 of the second hydraulic cylinder 40 is connected constantly with a third accumulator 56, while its rod chamber 44 is connected constantly with a fourth accumulator 60. Adjustable or fixed throttles can still be switched as in the first embodiment between the accumulators 26, 30, 56, 60 and the associated chambers 12, 14, 42, 44 of the hydraulic cylinders 10, 40. As in the first embodiment the accumulators 26, 30, 56 60 can be configured as membrane accumulators or as piston accumulators or bubble accumulators The piston chamber 12 of the first hydraulic cylinder 10 is connected over a line 22 with a valve arrangement 34a used as a first variable flow resistance, while its rod chamber 14 is connected over a line 28 with another valve arrangement 34b as second variable flow resistance. The piston chamber 42 of the second hydraulic cylinder 40 is connected over a line 52 to the valve arrangement 34b, while its rod chamber 44 is connected over a line 58 with a valve arrangement 34a. Each of the valve arrangements 34a, 34b are configured in the form of a proportional valve and actuated by external forces between a first position, shown in FIG. 3, in which the lines 22 and 58 (as well as 28 and 52) are separated from each other, and can be moved between a second position, not shown, in which the lines 22, 58 as well as 28, 52 can be directly connected to each other. Furthermore, the valve arrangements 34a, 34b can be brought into any desired number of intermediate positions. In the first position of the valve arrangement 34a, 34b the chambers 12, 14, 42, 44 of the hydraulic cylinders 10, 40 are in each case connected only with the associated accumulators 26, 30, 56, 60 and otherwise are shut off. In the second position the valve arrangement 34a, 34b connect on the one hand the first piston chamber 12 of the first hydraulic cylinder 10 and the second rod chamber 44 of the second hydraulic cylinder 40 as well as on the other hand the second piston chamber 42 of the second hydraulic cylinder 40 and the first rod chamber 14 of the first hydraulic cylinder 10 among each other. Differing from FIG. 3 the valve arrangement 34a, 34b still make possible an opening in their furthest closed position, that is the blind bores in the illustration may be connected by a throttle opening.

Analogous to the first embodiment, the result is a relatively hard spring suspension in the first position of the valve arrangement 34a, 34b, since the hydraulic cylinders 10, 40 in that configuration are double acting. In the second position of the valve arrangement 34a, 34b the result is a softer spring support, since the chambers 12, 14, 42, 44 of the hydraulic cylinders 10, 40 are cross connected, that effectively prevents vibrations in the clearance direction of the hydraulic cylinders 10, 40. In the intermediate positions of the valve arrangements 34a, 34b the result is a flow resistance that results in intermediate values relative to the spring support and the damping.

The lines 22 and 52 are still connected to a hydraulic level control 62, that in turn is controlled by means of a control arrangement 66, that contains level control 64 and the control arrangement 36 for the control of the valve arrangements 34a, 34b. The level control 64 influences the level control arrangement 62, to bring about a connection of the level to connect the line 22 and/or 52 with a source of pressurized hydraulic fluid or with a tank, in order to assure that the operator's cab is oriented horizontally at all times. The level control arrangement 64 also controls the control arrangement 36 by means of the valve arrangement 34a, 34b that are adjusted synchronously by means of the electromagnets 38, in order to assure a minimum opening of the valve arrangement 34a, 34b in the case of a change in the level. The control arrangement 36 makes the spring characteristics of the spring arrangement conform to the immediate operating conditions, for example, the loading on the vehicle, the characteristics of the ground, and the vibration condition of the operator's cab 68.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hydraulic spring suspension system having a first double acting hydraulic cylinder with a first piston chamber and a first rod chamber, a first accumulator that is constantly connected to the first piston chamber, a second accumulator that is constantly connected with the first rod chamber, a second double acting hydraulic cylinder with a second piston chamber and a second rod chamber, a third accumulator that is connected constantly with the second piston chamber, and a fourth accumulator that is connected constantly to a second rod chamber, characterized by:
    the first piston chamber and the second rod chamber are connected to each other by a first variable flow resistance, and
    the second piston chamber and the first rod chamber are connected to each other by a second variable flow resistance.

2. The hydraulic spring support system of claim 1, wherein:
    the variable flow resistance is connected to a control unit which reacts to environmental conditions.

3. The hydraulic spring support system of claim 1, wherein:
    the hydraulic spring support system supports an operator's station relative to a chassis of a vehicle.

4. The hydraulic spring support system of claim 1, wherein:
    the variable flow resistances are connected to a control unit which controls the flow resistances as a function of an actual load of the spring suspension system and actual vibrations performed by the spring suspension system.

5. The hydraulic spring support system of claim 1, wherein:
    the hydraulic spring suspension system supports an operator's station relative to a chassis of a vehicle.

6. A hydraulic spring suspension system having a first double acting hydraulic cylinder with a first piston chamber and a first rod chamber, a first accumulator that is constantly connected to the first piston chamber, a second accumulator that is constantly connected with the first rod chamber, a second double acting hydraulic cylinder with a second piston chamber and a second rod chamber, a third accumulator that is connected constantly with the second piston chamber, and a fourth accumulator that is connected constantly to a second rod chamber, characterized by:

the first piston chamber and the second rod chamber are connected to each other by a first proportional valve, and the second piston chamber and the first rod chamber are connected to each other by a second proportional valve.

* * * * *